United States Patent [19]

Forknall et al.

[11] Patent Number: 4,793,459
[45] Date of Patent: Dec. 27, 1988

[54] END CAP ASSEMBLIES FOR CONVEYOR ROLLERS

[75] Inventors: John P. Forknall, Barton-Le-Clay; Hubert W. T. Neal, Luton, both of England

[73] Assignee: SKF (U.K.) Limited, Luton, England

[21] Appl. No.: 37,154

[22] Filed: Apr. 10, 1987

Related U.S. Application Data

[63] Continuation-in-part of Ser. No. 779,956, Sep. 25, 1986, abandoned.

[30] Foreign Application Priority Data

Oct. 11, 1984 [GB] United Kingdom ............... 8425684

[51] Int. Cl.[4] .......................................... B65G 39/04
[52] U.S. Cl. .................................. 193/37; 198/842; 361/221; 29/123; 384/539
[58] Field of Search ............ 193/35 R, 37; 198/780, 198/842, 835; 29/148.4 D, 116 R, 118, 119, 123, 125, 129, 130; 361/212, 221; 384/418, 419, 489, 538, 546, 587, 539

[56] References Cited

U.S. PATENT DOCUMENTS

| | | | |
|---|---|---|---|
| 2,768,725 | 10/1956 | Foulds et al. | 193/37 |
| 4,315,566 | 2/1982 | Greener et al. | 193/37 |
| 4,339,158 | 7/1982 | Greener et al. | 193/37 X |

FOREIGN PATENT DOCUMENTS

2740302  3/1978  Fed. Rep. of Germany ........ 193/37

Primary Examiner—Robert J. Spar
Assistant Examiner—Lyle Kimms
Attorney, Agent, or Firm—Browdy & Neimark

[57] ABSTRACT

A conveyor roller comprises a steel roller tube fitted with end cap assemblies incorporating bearings for rotatably mounting the roller tube on a fixed shaft. Each end cap assembly comprises a rigid housing which supports the bearing, and a separate collar of resilient plastics material mounted on the housing. The axially inner end portion of the collar has an annular recess which receives a radial flange on the housing, and the axially outer end portion of the collar consists of inner and outer tubular walls which are spaced apart prior to fitting of the end cap assembly in the roller tube. The external surface of the inner tubular wall is curved radially inwards and axially outwards. Each end cap assembly is secured in position by swaging the end of the tube so as to force the outer wall of the collar against the inner wall along its length. The inner tubular wall of the collar may be of any suitable thickness, so that the end cap assembly can be adapted to fit roller tubes of different diameters by fitting the housing with a collar with an inner tubular wall of appropriate thickness. The radial flange on the housing may be formed with teeth and the axially inner end portion of the collar formed with tongues which project between the teeth so as to lock the collar to the housing for rotation therewith. In a construction in which the housing is made of steel, the teeth may engage the roller tube to provide an electrically conducting path therebetween for static electricity, or alternatively a wire of electrically conducting material may have one end clamped between the collar and the housing and the other end clamped between the collar and the roller tube.

11 Claims, 8 Drawing Sheets

END CAP ASSEMBLIES FOR CONVEYOR ROLLERS

This application is a continuation-in-part of our co-pending application Ser. No. 779,956 filed Sept. 25, 1985 now abandoned.

This invention relates to conveyor rollers of the kind comprising a roller tube fitted with end cap assemblies incorporating bearings for rotatably mounting the roller tube on a fixed shaft.

In conventional constructions of conveyor rollers of this kind, the roller tubes are made of steel and each end cap assembly comprises a steel housing which is secured to the end of the roller tube by arc or friction welding. The welding of the housings to the tube is however a difficult manufacturing process, and adverse results on roller accuracy are common in mass production. The production costs are thus high. It is known to swage steel roller tubes onto end cap assemblies having rigid housings made of plastics material moulded to the final shape which will be taken up by the deformed steel tube. It is however difficult to obtain an acceptable rotationally secure fit by swaging a tube down on to such a preformed, rigid, moulded plastics housings, since the steel tube when deformed is subject to a degree of "spring-back" which reduces or can even remove the force acting between the housing and the steel tube. Also, plastics material is relatively expensive, and it is necessary to use a much larger volume of the plastics material than the volume of steel used in steel end caps to provide the necessary strength.

In U.S. Pat. No. 4,315,566 it has been proposed to provide an end cap assembly with a plastics housing having an integral collar of a size to be a sliding fit within the roller tube, the collar being forced down against a curved abutment surface on the housing upon swaging of the roller tube. This construction provides a rotationally secure fit, but the housing and collar unit is relatively costly and it is necessary to make the whole unit of a plastics having the necessary resilient properties required in the collar. Also, the housing and collar unit is adapted to fit only one diameter of roller tube.

In U.S. Pat. No. 4,339,158 it has been proposed to provide an end cap assembly with a rigid housing and a separate collar of plastics material mounted on the housing, the collar being of a size to be a sliding fit within the roller tube and the collar being forced down against a curved abutment surface on the housing upon swaging of the roller tube. The housing is costly if made in plastics material due to the cost of the material, and the housing is costly if made of metal due to the difficulty in providing a curved abutment surface. Moreover, the thickness of the collar is restricted by the need to provide sufficient flexibility to enable the collar to be swaged onto the curved abutment surface so that the end cap is not readily adaptable to fit different diameters of roller tubes. Also, the roller tube is electrically insulated by the plastics collar from the frame of the conveyor and it is difficult to arrange for discharge of any static electricity which may be generated in the roller tube during operation of the conveyor.

The object of the invention is to provide an improved construction of an end cap assembly for a roller tube of a conveyor roller which can be low cost and simple to assemble, but which nevertheless provides adequate strength.

Another object of the invention is to provide an end cap assembly which can readily be adapted to fit roller tubes of different diameter.

According to the present invention there is provided an end cap assembly for a roller tube of a conveyor roller, comprising an annular housing having an axially inner end and an axially outer end, a collar mounted on and surrounding the housing, and a bearing mounted in the housing for rotatably supporting the end cap assembly and roller tube on a shaft, wherein the annular housing and the collar are separate components, the annular housing is a substantially rigid structure having a radially inner wall and a radially outer wall, said radially inner wall defining a recess for reception of the bearing, the collar is formed of a resilient plastics material and comprises an inner tubular wall, an outer tubular wall surrounding said inner tubular wall, and an annular portion integral with the axially inner ends of the tubular walls of the collar, the inner tubular wall of the collar lies along said outer wall of the housing and has a radially outer surface which is curved radially inwards in the direction towards the axially outer end of said inner tubular wall over at least part of the length of said inner tubular wall, the outer tubular wall of the collar is of a size to be a sliding fit within an end of the roller tube and is formed at the axially outer end thereof with an outwardly projecting radial flange adapted to abut the end of the roller tube, and the axially outer end portion of the outer tubular wall of the collar is spaced radially from said curved outer surface of the inner tubular wall of the collar and is movable radially inwards against its own resilient resistance to deformation into abutting contact with said curved outer surface of the inner tubular wall of the collar, so that the end cap assembly can be firmly secured in an end of the roller tube by positioning the assembly in the tube with the outwardly projecting radial flange on the collar abutting the end of the tube and swaging the end of the tube radially inwards so as to force the outer tubular wall of the collar against the inner tubular wall of the collar with at least part of the outer tubular wall of the collar lying along the curved outer surface of the inner tubular wall of the collar and deformed to the curvature thereof.

The housing may be made of plastics or of metal, but is preferably made as a pressing in sheet steel.

Since the inner tubular wall of the collar is mounted on the housing, the inner wall of the collar may be of a suitable thickness. Thus, housings of standard size may be fitted with any of a plurality of collars each having an inner tubular wall of a different thickness to form end cap assemblies adapted to fit roller tubes of different diameters.

The radially outer wall of the housing is preferably formed at its axially inner end thereof with an outwardly projecting radial flange, and the collar formed with a groove which receives the flange on the housing. In end cap assemblies having housings of electrically conducting material, the radial flange on the housing may be formed with teeth which engage the inside surface of the roller tube so as to provide electrical paths for passage of static elecricity from the roller tube to the housing. Alternatively, a wire or strip of electrically conducting material may be mounted on the collar with one end of the wire or strip clamped between the collar and the housing and the other end of the wire or strip clamped between the collar and the roller tube.

Embodiments of the invention will now be described, by way of example, with reference to the accompanying drawings, in which like parts are denoted by like reference numerals, and in which.

Figure 1:
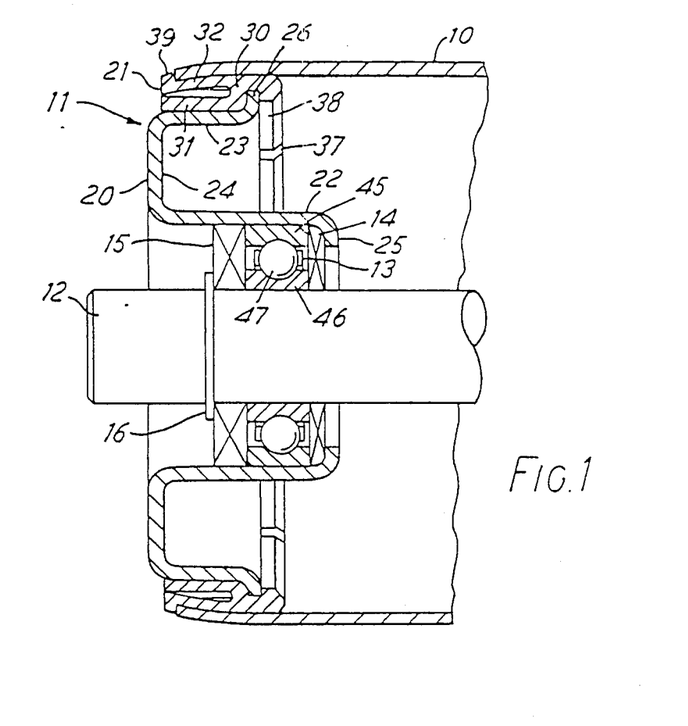
FIG. 1 is an axial cross section of one end of a conveyor roller showing the roller tube swaged onto the end cap assembly.
Figure 2:
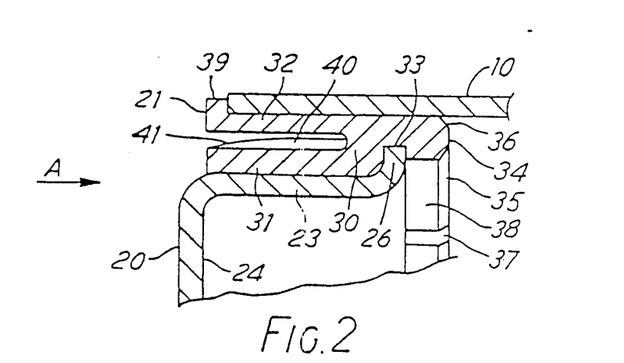
FIG. 2 is an axial cross section of part of the conveyor roller of FIG. 1 prior to swaging of the roller tube onto the end cap assembly.
Figure 3:
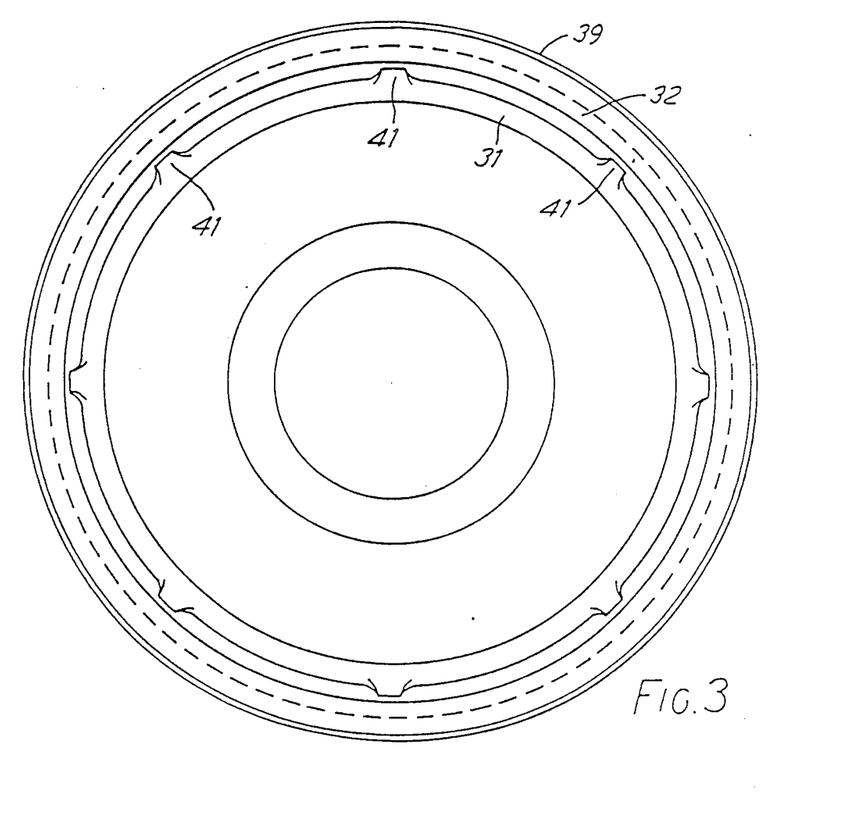
FIG. 3 is an end view of the conveyor roller of FIGS. 1 and 2 taken in the direction of arrow A in FIG. 2 and prior to swaging of the roller tube onto the end cap assembly.

The conveyor roller of FIGS. 1–3 comprises a roller tube 10 and two end cap assemblies 11 (only one of which is shown in FIG. 1) fitted one in each end of the roller tube, the ends of the roller tube being swaged onto the end cap assemblies. The conveyor roller is rotatably mounted on a fixed shaft 12 by two bearings 13 fitted one in each end cap assembly 11, each bearing protected by an inner seal 14 and an outer seal 15. The conveyor roller is located axially on the shaft by circlips 16 which abut a component of the outer seal 15.

Each end cap assembly 11 comprises a rigid annular housing 20 made of steel and a collar 21 of resilient plastics material fitted onto the housing 20. The housing 20 comprises a cylindrical inner wall 22, a cylindrical outer wall 23 surrounding the inner wall 22, and an annular end wall 24 integral with the axially outer ends of the walls 22, 23. The axially inner end of the wall 22 is turned radially inwards to form an inner radial flange 25, the wall 22 and flange 25 co-operating to define a recess for reception of the associated bearing 13. The axially inner end of the wall 23 is turned radially outwards to form an outer radial flange 26.

The collar 21 comprises a ring-shaped portion 30, a cylindrical inner wall 31 integral with the axially outer side of the ring-shaped portion 30, and an annular outer wall 32 surrounding the wall 31 and also integral with the axially outer side of the ring-shaped portion 30. When the collar is in an unstressed condition prior to swaging of the roller tube onto the collar, the wall 32 is substantially cylindrical and spaced from the wall 31 as shown in FIG. 2. The radially inner surface of the ring-shaped portion 30 is formed with an annular groove 33 which receives the outer radial flange 26 on the housing as a close fit, and the axially inner end 34 of the portion 30 has chamfer surfaces 35, 36 at its radially inner and radially outer peripheries for a purpose described hereinafter. The part of the ring-shaped portion 30 between the groove 33 and the axially inner end wall 34 of the collar is divided by axial grooves 37 to form an annular series of lugs 38 which project radially inwards. The axially outer end of the wall 32 is formed with an outwardly projecting radial flange 39. The radially outer surface of the wall 31 is formed with a plurality of axially extending ribs 40 spaced around the collar, the radially outer surfaces 41 of the ribs at the axially inner ends thereof being parallel and spaced close to of the wall 32, and the remainder of the radially outer surfaces 41 of the ribs being curved radially inwards in the direction towards the axially outer end of the collar, as shown in FIG. 2.

The collar 21 is mounted on the housing 20 by fitting the ring-shaped portion 30 of th collar onto the axially outer end of the cylindrical wall 23 of the housing, and then forcing the collar axially inwards along the wall 23 of the housing. The collar is designed so that the wall 31 is an interference fit on the wall 23 of the housing. When the chamfer surface 35 on the collar engages the radial outer flange 26 on the housing, the lugs 38 are flexed radially outwards and pass over the flange 26, whereupon the lugs snap back into position shown in FIG. 2, with the radial flange 26 engaged in the annular groove 33.

The bearing 13 comprises an outer bearing ring 45 mounted as a tight fit on the inside surface of the cylindrical wall 22 of the housing, an inner bearing ring 46 mounted as a close sliding fit on the shaft 12, and a plurality of balls 47 rotatable in grooved tracks on the two bearing rings. The inner seal 14 abuts the inner radial flange 25, and the outer bearing ring 45 abuts against the inner seal 14. The seals can be of any suitable construction.

The end cap assembly 11 is designed for use with a cylindrical steel roller tube 10 having an internal diameter such that the end cap assembly is a hand push-fit within the roller tube, the roller tube having an external diameter which is not smaller than that of the flange 39 on the collar. The chamfer surface 36 facilitates fitting of the end cap assembly in the roller tube. The end cap assembly is secured in position in the end of the roller tube, with the flange 39 abutting the end of the roller tube, by swaging the end of the roller tube radially inwards, that is reducing the diameter of the end of the roller tube by external pressure, so as to force the outer wall 32 of the collar against the ribs 40 on the inner wall 31 of the collar, whereby the outer wall 32 of the collar lies along the curved outer surfaces 41 of the ribs and is deformed to the curvature of the surfaces 41, as shown in FIG. 1. The housing 11, which is made of steel, is a rigid structure which substantially resists deformation under the swaging pressure applied to the roller tube.

In the swaging operation the end of the roller tube must of course be deformed beyond its elastic limit so as to prevent or reduce "spring-back" of the roller tube. The collar 21 is however made of a plastics material having a substantially higher degree of elasticity than the metal of the roller tube, and the radius of curvature of the outer surfaces 41 of the ribs is such that, when the outer wall 32 of the collar is forced onto the inner wall 31, the strain in the outer wall 32 does not exceed a predetermined value at any point along its length. Thus, after the swaging operation, the wall 32 of the collar acts as a spring which provides and maintains a force between the collar and the bore of the roller tube should "spring-back" occur in the tube after the swaging tool has been removed, thereby ensuring that the end cap assembly is a firm non-rotational fit within the roller tube. The end cap assembly is of course secured against outward axial movement by the swaged end of the roller tube, and against inward axial movement by engagement of the flange 39 against the end of the roller tube. The external diameter of the end of the roller tube is not less than that of the flange 39, as explained above, to ensure that the swaging tool contacts the steel tube and not the flange 39 during the swaging operation.

The strain in the plastics material of the collar is preferably the maximum under which significant creep or relaxation of the plastics sufficient to loosen the fit of the end cap assembly in the roller tube will not occur in service.

Figure 4:
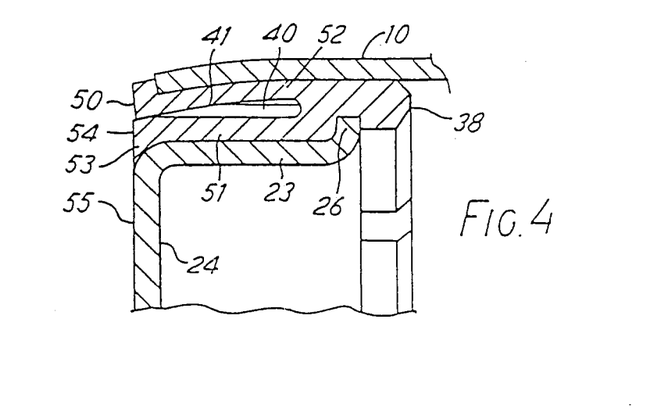
FIG. 4 is an axial cross section of part of one end of a modification of the conveyor roller of FIG. 1.

The conveyor roller of FIG. 4 is similar to that of FIGS. 1-3, except that the collar 50 extends along the full axial length of the outer wall 23 of the housing. The collar 50 comprises an inner wall 51 and an outer wall 52 which correspond to the walls 31, 32 respectively of the collar of FIG. 1. The inner wall 51 however terminates in an annular fillet 53 which conforms to the junction between the walls 23, 24 of the housing so that the end surface 54 of the inner wall 51 of the collar is substantially flush with the outer surface 55 of the end wall 24 of the housing without any gap therebetween. This construction provides the maximum area of contact between the collar and the housing, and thereby provides the maximum frictional resistance against relative rotation therebetween. In addition, the axial ribs 40 on the radially outer surface of the wall 51 of the collar terminate short of the outer end of the wall 51, the outer end portion of the radially outer surface of the wall 51 is flush with the surfaces 41 on the ribs 40 and has the same radius of curvature, and the outer wall 52 is swaged down onto the axially outer end of the wall 51. With this construction, the outer ends of the walls 51, 52 can contact one another throughout their full peripheries so that there is no open gap between the walls in which dirt or unwanted material could accumulate or become entrapped.

Figure 5:
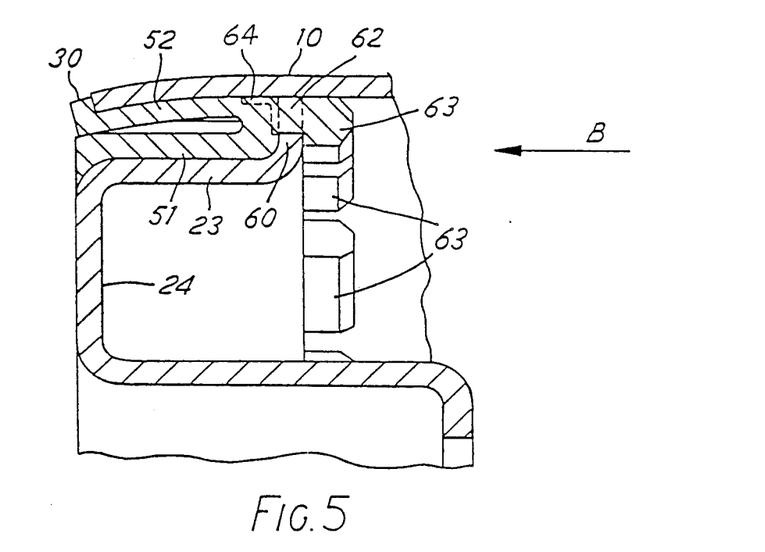
FIG. 5 is an axial cross section of part of one end of another modification of the conveyor roller of FIG. 1 taken along the line V—V in FIG. 6.
Figure 6:
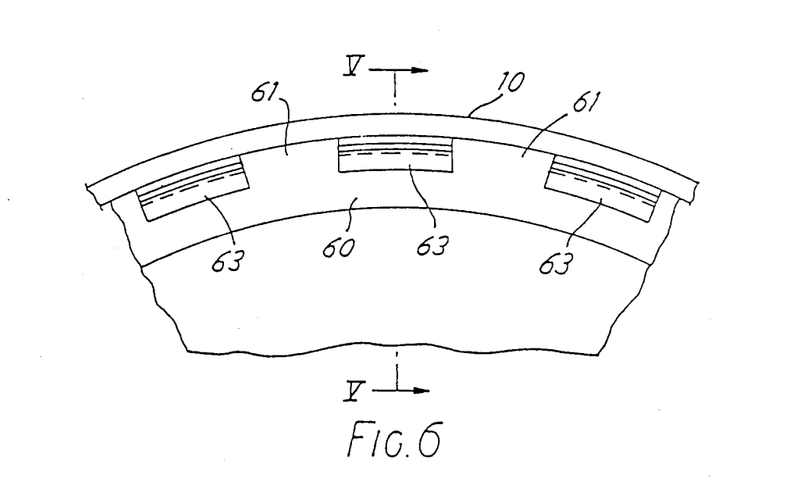
FIG. 6 is an end view of the part of the conveyor roller shown in FIG. 5 taken in the direction of the arrow B in FIG. 5.

The conveyor roller of FIGS. 5 and 6 is similar to that of FIG. 4, except that the outer radial flange on the housing, indicated by the reference 60 in FIGS. 5 and 6, is formed with teeth 61, which are in contact with the inside surface of the roller tube 10, the ring-shaped portion of the collar has tongues 62 which extend through the gaps between the teeth, and the ends of the tongues 62 are formed with inwardly projecting lugs 63 which engage the parts of the radial flange 60 between the teeth. This construction has the advantage that the collar is locked to the housing for rotation therewith by the engagement of the tongues 62 between the teeth 61. In addition, the engagement of the teeth with the roller tube provides electrical paths for passage of static electricity from the tube to the housing.

The conveyor roller of FIGS. 5 and 6 may be designed so that the teeth 61 do not contact the roller tube 10, and wires or strips of electrically conducting material are fitted in the gaps between adjacent tongues 62 to provide electrical paths for passage of static electricity from the roller tube to the housing. FIG. 5 shows in broken lines one example of a wire 64 of electrically conducting material having one end thereof extending between two adjacent tongues 62 on the collar and clamped between the collar and the tooth 61 between the two tongues, the other end of the wire 64 lying along the radially outer surface of the collar and being clamped between the collar and the roller tube 10. The resilient plastics material of the collar is deformed by the wire 64, upon fitting of the end cap assembly into the roller tube, to provide a recess which accommodates the wire. Alternatively, an electrically conducting path between the roller tube and the housing may be provided by a spring clip (not shown) having a shape approximately that of an inverted U and comprising two side portions interconnected at one end by a bight portion, the two side portions projecting underneath the two adjacent tongues 62 respectively and being clamped between the collar and the housing, and the bight portion being in contact with the inside surface of the roller tube. The bight portion can conveniently have a flange which overlies the collar so as to be clamped between the collar and the roller tube upon fitting of the end cap assembly into the roller tube.

Figure 7:
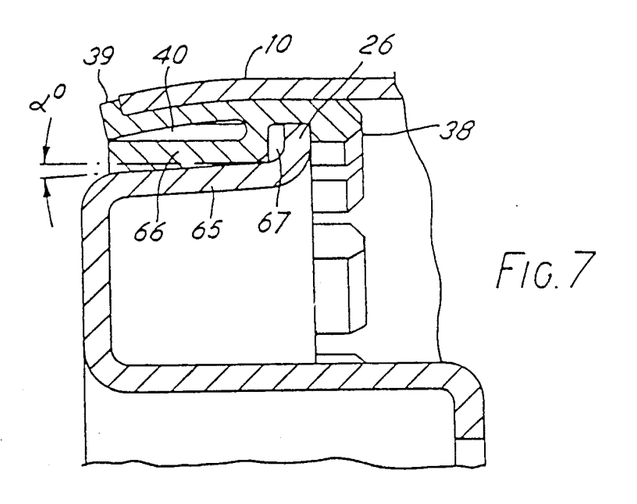
FIG. 7 is an axial cross section of part of yet another modification of the conveyor roller of FIG. 1.

The conveyor roller of FIG. 7 is similar to that of FIG. 1 except that the radially outer wall of the housing, indicated by the reference 65 in FIG. 7, is frusto-conical and tapers at a small angle $\alpha$ (for example 3 degrees) in the direction of the outer end of the housing, and the radially inner wall of the collar indicated by the reference 66 in FIG. 7 has a radially inner surface which is frusto-conical and tapers at the same angle $\alpha$ in the direction of the outer end of the collar. The radially outer surface of the inner wall 66 of the collar is however cylindrical and formed with axial ribs 40 identical to the axial ribs on the collar of FIG. 1. Also, in the collar of FIG. 7, the annular groove indicated by the reference 67 is wider than the thickness of the radial flange 26 on the housing. Upon assembly of the end cap assembly of FIG. 7, the clearance between the flange 26 on the housing and the sides of the groove 67 in the collar allows the collar to be forced onto the housing so that the tapered surfaces on the collar and housing are an interference fit. This construction ensures that there is a high frictional resistance against relative rotation between the collar and the housing.

Figure 8:
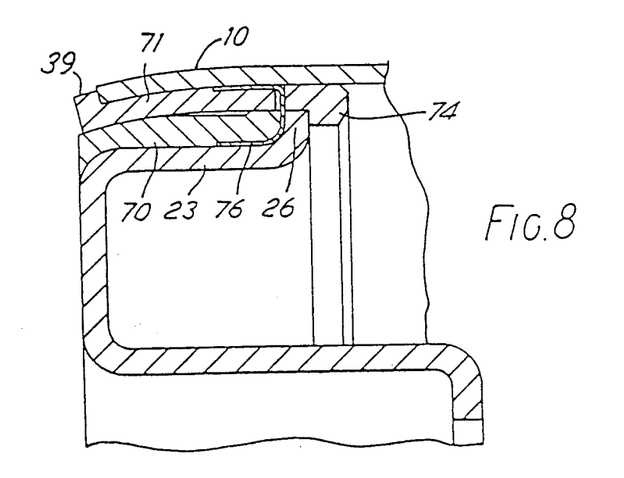
FIG. 8 is an axial cross section of part of a further modification of the conveyor roller of FIG. 1.
Figure 9:
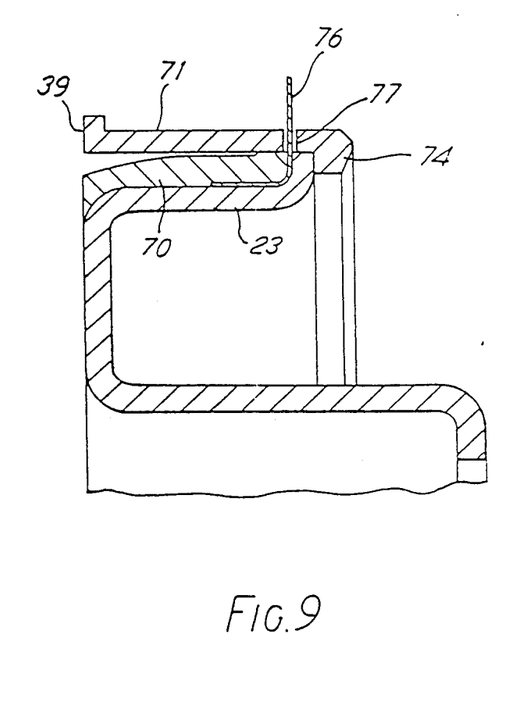
FIG. 9 is an axial cross section of part of the end cap assembly of the conveyor roller of FIG. 8 prior to the fitting of the end cap assembly in the end of the roller tube.

The conveyor roller of FIGS. 8 and 9 is similar to that of FIG. 4, except that the collar is formed in two separate parts and comprises an inner tubular member 70 mounted on the outer wall 23 of the housing and an outer tubular member 71 mounted on the flange 26 of the housing and on the inner member 70. The members 70, 71 are made of resilient plastics material. The radially inner surface of the member 70 has a shape which is complementary to that of the radially outer surface of the wall 23 of the housing and is in direct contact therewith over substantially its whole area. The radially outer surface of the member 70 has a cylindrical portion adjacent the outer flange 26 of the housing, and the remainder of the outer surface of the member 70 is curved radially inwards in the direction towards the axially outer end thereof. The cylindrical portion of the outer surface of member 70 is flush with the periphery of the flange 26 on the housing. The outer tubular member 71 is mounted as an interference fit on the flange 26 and on the cylindrical portion of the outer surface of the inner tubular member 70, and is formed at its axially inner end with an inwardly projecting radial flange 74 which abuts against the flange 26 on the housing. The axially outer end of the member is formed with the outwardly projecting radial flange 39. When the collar is in an unstressed condition prior to swaging of the roller tube onto the collar, the outer member 71 is substantially cylindrical as shown in FIG. 9. One or more wires 76 of an electrically conducting material is clamped between the inner member 70 and the wall 23 of the housing, each wire passing through an aperture 77 in the outer member 71 of the collar. When the end cap assembly is fitted into an end of the roller tube, the free end of each wire 76 is trapped between the outer tubular member 71 of the collar and the roller tube shown in FIG. 8. The end of the roller tube is swaged onto the collar so that the outer member is deformed to the curvature of the radially outer surface of the inner member 70 and forms a spring support for the roller tube in the manner previously described with reference to the embodiments in FIGS. 1-3. The wire 76 provides an electrical path for passage of static electricity from the roller tube to the housing.

Figure 10:
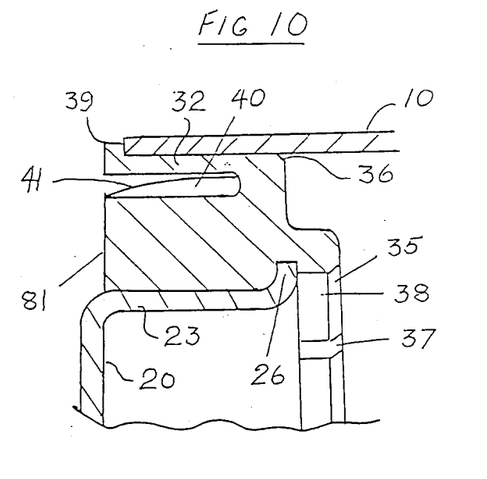
FIG. 10 is an axial cross section of part of one end of another modification of the conveyor roller of FIG. 1 prior to swaging.

The conveyor roller of FIG. 10 is similar to that of FIG. 2 and like parts are denoted by like reference numerals. In FIG. 10 however the cylindrical inner wall 81 of the collar is substantially thicker than the outer wall 32 of the collar. The thickness of the outer wall 32 is of course restricted by the requirement that the outer wall be capable of being deformed under the swaging operation, against its resilient resistance to deformation, to the curvature of the radially outer abutment surfaces 41 of the ribs 40 on the inner wall 81, but the inner wall 81 of the collar may be substantially rigid member of any desired thickness. A housing 20 of standard size may thus be fitted with any of a plurality of collars having inner walls 81 of different thickness to fit roller tubes of different diameter.

Figure 11:
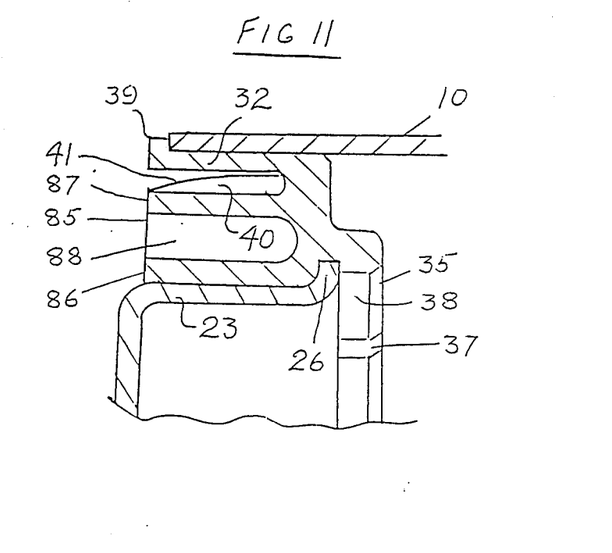
FIG. 11 is an axial cross section of part of one end of yet another modification of the conveyor roller of FIG. 1 prior to swaging.
Figure 12:
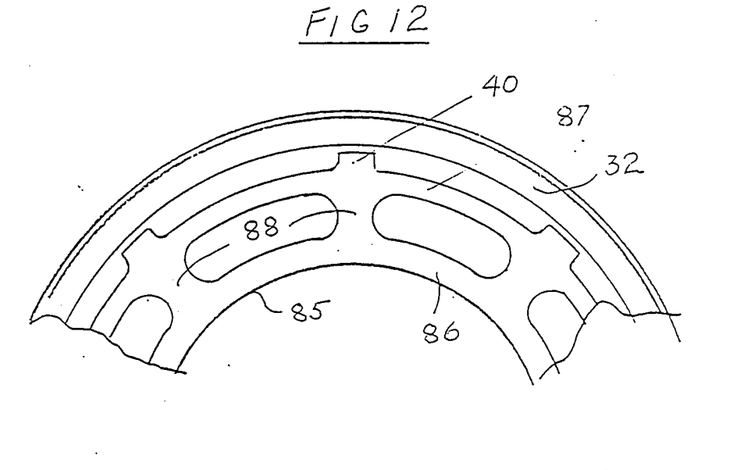
FIG. 12 is an end view of the part of the conveyor roller shown in FIG. 11.

The conveyor roller of FIGS. 11 and 12 is similar to that of FIG. 10 and like parts are denoted by like reference numerals. In FIGS. 11 and 12 however the inner wall 85 comprises an inner tubular section 86, an outer tubular section 87 surrounding the inner section 86, and axially extending webs 88 interconnecting the two sections. This construction has of course the advantage over that of FIG. 10 of requiring less plastics material in manufacture.

In the described embodiments, the collar may be manufactured with the lugs 38 projecting radially outwards. The collar can then easily be mounted on the housing with the radial flange on the housing aligned with the annular groove in the collar and the lugs 38 forced radially inwards to deform them permanently in a position in which the lugs engage against the axially inner side of the radial flange on the housing. The lugs will of course be held in this position by the roller tube when the end cap is inserted in the roller tube.

We claim:

1. An end cap assembly for a roller tube of a conveyor roller, comprising an annular housing having an axially inner end and an axially outer end, a collar mounted on and surrounding the housing, and a bearing mounted in the housing for rotatably supporting the end cap assembly and roller tube on a shaft, in which the annular housing and the collar are separate components, the annular housing is a substantially rigid structure having a radially inner wall and a radially outer wall, said radially inner wall defining a recess for reception of the bearing, the collar is formed of a resilient plastics material and comprises an inner tubular wall and an outer tubular wall surrounding said inner tubular wall, the inner tubular wall of the collar lies along said outer wall of the housing and has a radially outer surface which is curved radially inwards in the direction towards the axially outer end of said inner tubular wall over at least part of the length of said inner tubular wall, the outer tubular wall of the collar is of a size to be a sliding fit within an end of the roller tube and is formed at the axially outer end thereof with an outwardly projecting radial flange adapted to abut the end of the roller tube, and the axially outer end portion of the outer tubular wall of the collar is spaced radially from said curved outer surface of the inner tubular wall of the collar and is movable radially inwards against its own resilient resistance to deformation into abutting contact with said curved outer surface of the inner tubular wall of the collar, so that the end cap assembly can be firmly secured in an end of the roller tube by positioning the assembly in the tube with the outwardly projecting radial flange on the collar abutting the end of the tube and swaging the end of the tube radially inwards so as to force the outer tubular wall of the collar against the inner tubular wall of the collar with at least part of the outer tubular wall of the collar lying along the curved outer surface of the inner tubular wall of the collar and deformed to the curvature thereof, wherein the radially outer wall of the housing is formed at its axially inner end thereof with an outwardly projecting radial flange, the collar has an annular portion integral with the axially inner ends of the tubular walls of the collar, said annular portion of the collar is formed with a groove which receives said flange on the housing, and the part of the collar between said groove and the axially inner end of the collar has axial grooves which divide said part of the collar to form an annular series of lugs which project axially, the lugs being deformable radially outwards to facilitate fitting of the collar on the radial flange on the housing.

2. An end cap assembly as claimed in claim 1, wherein the radial flange on the housing is formed at its periphery with teeth having gaps therebetween, and the collar is formed with tongues which extend through the gaps between the teeth, whereby the collar is locked to the housing for rotation therewith.

3. An end cap assembly as claimed in claim 1, wherein the outer wall of the housing has a radially outer surface which is frusto-conical and tapers in the direction of the axially outer end of the housing, and the inner tubular wall of the collar has a radially inner surface which is frusto-conical and tapers in the direction of the axial outer end of the collar, the inner wall of the collar being a force fit on the outer wall of the housing.

4. An end cap assembly as claimed in claim 1, wherein the housing includes an end wall integral with the axially outer ends of the inner and outer walls of the housing, the inner and outer walls of the housing being cylindrical and the junction between the end wall and the outer wall of the housing being curved, the inner tubular wall of the collar is an interference fit on the outer wall of the housing, and the axially outer end of the inner tubular wall of the collar is formed with an annular fillet which conforms to said junction so as to provide substantially the maximum area of contact between the collar and the housing.

5. An end cap assembly as claimed in claim 1, wherein the inner tubular wall of the collar is a substantially rigid member of a thickness substantially greater than that of the outer tubular wall of the collar and determined by the annular space between the housing and the roller tube, whereby the annular housing may be fitted with a selected one of a plurality of collars each having an inner tubular wall of different thickness to adapt the end cap assembly for use with roller tubes of different diameters.

6. An end cap assembly as claimed in claim 1, wherein the inner tubular wall of the collar comprises inner and outer tubular sections interconnected by webs betweeen the sections to form a substantially rigid inner tubular wall with a wall thickness substantially greater than that of the outer tubular wall of the collar.

7. An end cap assembly for a roller tube of a conveyor roller, comprising an annular housing having an axially inner end and an axially outer end, a collar surrounding the housing, and a bearing mounted in the housing for rotatably supporting the end cap assembly and roller tube on a shaft, wherein the annular housing and the collar are separate components, the annular housing is a substantially rigid structure having a radially inner wall defining a recess for reception of the bearing and a radially outer wall suppporting the collar, the axially inner end of the outer wall of the housing is formed with an outwardly projecting radial flange, the collar comprises an inner tubular member and a separate outer tubular member, said inner tubular member is mounted on the outer wall of the housing and abuts the axially outer side of the radial flange on the housing, said outer tubular member is mounted on the inner tubular member, the outer tubular member having an inwardly projecting radial flange which abuts the axially inner side of the radial flange on the housing, the inner tubular member has a radially outer surface which is curved radially inwards in the direction towards the axially outer end thereof over at least part of the length thereof, the outer tubular member is of a size to be a sliding fit within an end of the roller tube and is formed at the axially outer end thereof with an outwardly projecting radial flange adapted to abut the end of the roller tube, and the axially outer end portion of the outer tubular member is spaced radially from said curved outer surface of the inner tubular member and is movable radially inwards against its own resilient resistance to deformation into abutting contact with the curved outer surface of the inner tubular member, so that the end cap assembly can be firmly secured in an end of the roller tube by positioning the assembly in the tube with the outwardly projecting radial flange on the outer tubular member abutting the end of the roller tube and swaging the end of the tube radially inwards so as to force the outer tubular member against the inner tubular member with at least part of the outer tubular member lying along the curved outer surface of the inner tubular member and deformed to the curvature thereof.

8. An end cap assembly for a roller tube of a conveyor roller, comprising an annular housing having an axially inner end and an axially outer end, a collar surrounding the housing, and a bearing mounted in the housing for rotatably supporting the end cap assembly and roller tube on a shaft, in which the annular housing and the collar are separate components, the annular housing is a substantially rigid structure having a radially inner wall defining a recess for reception of the bearing and a radially outer wall supporting the collar, the collar has a radially inner wall and a radially outer wall, the inner wall of the collar lies along the outer wall of the housing and has a radially outer surface which is curved radially inwards in the direction towards the axially outer end thereof over at least part of the length thereof, the outer wall of the collar is of a size to be a sliding fit within an end of the roller tube and is formed at the axially outer end thereof with an outwardly projecting radial flange adapted to abut the end of the roller tube, and the axially outer end portion of the outer wall of the collar is spaced radially from said curved outer surface of the inner wall of the collar and is movable radially inwards against its own resilient resistance to deformation into abutting contact with the curved outer surface of the inner wall of the collar, so that the end cap assembly can be firmly secured in an end of the roller tube by positioning the assembly in the tube with the outwardly projecting radial flange on the collar abutting the end of the tube and swaging the end of the tube radially inwards so as to force the outer wall of the collar against the inner wall of the collar with at least part of the outer wall of the collar lying along the curved outer surface of the inner wall of the collar and deformed to the curvature thereof, wherein the housing is made of electrical conducting material and the collar is made of plastics, the outer wall of the housing is formed at its axially inner end with an outwardly projecting radial flange, the outer periphery of said radial flange being formed with teeth having gaps therebetween, the collar is formed with tongues which extend through the gaps between the teeth, and the teeth are arranged to engage the inside surface of the roller tube when the assembly is fitted therein so as to provide electrical paths for passage of static electricity from the roller tube to the housing.

9. An end cap assembly for a roller tube of a conveyor roller, comprising an annular housing having a collar surrounding the housing, and a bearing mounted in the housing for rotatably supporting the end cap assembly and roller tube on a shaft, in which the annular housing and the collar are separate components, the annular housing is a substantially rigid structure having a radially inner wall defining a recess for reception of the bearing and a radially outer wall supporting the collar, the collar has a radially inner wall and a radially outer wall, the inner wall of the collar lies along the outer wall of the housing and has a radially outer surface which is curved radially inwards in the direction towards the axially outer end thereof over at least part of the length thereof, the outer wall of the collar is of a size to be a sliding fit within an end of the roller tube and is formed at the axially outer end thereof with an outwardly projecting radial flange adapted to abut the end of the roller tube, and the axially outer end portion of the outer wall of the collar is spaced radially from said curved outer surface of the inner wall of the collar and is movable radially inwards against its own resilient resistance to deformation into abutting contact with the curved outer surface of the inner wall of the collar, so that the end cap assembly can be firmly secured in an end of the roller tube by positioning the assembly in the tube with the outwardly projecting radial flange on the collar abutting the end of the tube and swaging the end of the tube radially inwards so as to force the outer wall of the collar against the inner wall of the collar with at least part of the outer wall of the collar lying along the curved outer surface of the inner wall of the collar and deformed to the curvature thereof, wherein the housing is made of metal, the collar is made of resilient plastics material, and the collar is fitted with one or more wires or strips of electrically conducting material, which each wire or strip having one part thereof clamped between the collar and the housing, and another part thereof arranged to be clamped between the collar and the roller tube upon fitting of the assembly into the roller tube.

10. An end cap assembly as claimed in claim 9, wherein the collar has an aperture, and the wire or strip extends through said aperture.

11. An end cap assembly as claimed in claim 9, wherein the radially outer wall of the housing is formed at its axially inner end with an outwardly projecting flange, the outer periphery of said radial flange being formed with teeth having gaps therebetween, the collar is formed with tongues which extend through the gaps between the teeth whereby the collar is locked to the housing for rotation thereof, and said one or more strips of electrically conducting material are located in the gap between two adjacent tongues on the collar with part of the strip clamped between the collar and housing and another part thereof arranged to be clamped between the collar and the roller tube upon fitting the assembly into the roller tube.

* * * * *